(12) United States Patent
Layfield et al.

(10) Patent No.: US 9,956,997 B2
(45) Date of Patent: May 1, 2018

(54) DRAG REDUCTION FAIRING FOR A TRAILER CONVERTER DOLLY

(71) Applicant: Laydon Composites Ltd., Oakville, Ontario (CA)

(72) Inventors: Brian P. Layfield, Oakville (CA); James D. Haws, Oakville (CA)

(73) Assignee: LAYDON COMPOSITES LTD., Oakville (CA)

( * ) Notice: Subject to any disclaimer, the term of this patent is extended or adjusted under 35 U.S.C. 154(b) by 0 days. days.

(21) Appl. No.: 14/698,234

(22) Filed: Apr. 28, 2015

(65) Prior Publication Data
US 2015/0307142 A1 Oct. 29, 2015

Related U.S. Application Data

(60) Provisional application No. 61/985,179, filed on Apr. 28, 2014.

(51) Int. Cl.
*B62D 35/00* (2006.01)
*B62D 53/08* (2006.01)
*B62D 25/16* (2006.01)
*B62D 25/18* (2006.01)

(52) U.S. Cl.
CPC ......... *B62D 35/001* (2013.01); *B62D 25/161* (2013.01); *B62D 25/168* (2013.01); *B62D 25/188* (2013.01); *B62D 53/0807* (2013.01); *B62D 53/0864* (2013.01)

(58) Field of Classification Search
CPC .. B62D 35/001; B62D 35/004; B62D 35/005; B62D 27/02
See application file for complete search history.

(56) References Cited

U.S. PATENT DOCUMENTS

| | | | |
|---|---|---|---|
| 4,262,953 A | 4/1981 | McErlane | |
| 4,555,870 A * | 12/1985 | McKinnon | ............ B60R 13/043 49/462 |
| 4,640,541 A | 2/1987 | FitzGerald | |
| 4,938,524 A | 7/1990 | Straub | |
| 5,056,860 A * | 10/1991 | Cornacchia | ............ B62D 15/02 280/762 |
| 5,836,399 A * | 11/1998 | Maiwald | .............. B62D 25/186 172/509 |
| 5,921,617 A | 7/1999 | Loewen | |
| 6,644,720 B2 | 11/2003 | Long | |
| 6,837,536 B1 | 1/2005 | Schwartz | |
| 6,974,178 B2 | 12/2005 | Ortega | |
| 7,093,889 B2 | 8/2006 | Graham | |
| 7,578,541 B2 | 8/2009 | Layfield | |
| 8,256,826 B2 * | 9/2012 | Fioravanti | .............. B62D 35/00 296/180.1 |
| 8,720,931 B2 * | 5/2014 | Zaagman | ............... B60D 1/015 280/407 |
| 8,814,253 B1 * | 8/2014 | Butler | .................. B62D 25/163 296/180.4 |

(Continued)

*Primary Examiner* — Tony H Winner
(74) *Attorney, Agent, or Firm* — Jeffrey S. Melcher; Manelli Selter PLLC

(57) ABSTRACT

A converter dolly is provided for use with a tractor-trailer wherein the converter dolly additionally comprises dolly fairings which are located in front of the wheels of the converter dolly. The dolly fairings are preferably made of fibreglass, and improve the aerodynamic efficiency of the converter dolly, and thus reduce fuel consumption.

9 Claims, 6 Drawing Sheets

(56) References Cited

U.S. PATENT DOCUMENTS

| | | | |
|---|---|---|---|
| 2003/0132604 A1* | 7/2003 | Evans | B62D 53/06 |
| | | | 280/438.1 |
| 2008/0164722 A1* | 7/2008 | Breidenbach | B62D 35/001 |
| | | | 296/180.1 |
| 2008/0238139 A1* | 10/2008 | Cardolle | B62D 35/001 |
| | | | 296/180.4 |
| 2008/0296930 A1 | 12/2008 | Roush | |
| 2010/0066123 A1* | 3/2010 | Ortega | B62D 35/02 |
| | | | 296/180.4 |

* cited by examiner

DRAG REDUCTION FAIRING FOR A TRAILER CONVERTER DOLLY

FIELD OF THE INVENTION

This invention relates to devices to reduce drag and therefore increase fuel efficiency with respect to trailers, and in particular, relates to fairings which are to be used in combination with trailer converter dollies.

BACKGROUND OF THE INVENTION

In recent years, trucking companies have become more conscious of the costs of fuel consumed by their vehicles, particularly those trucks—which are very often referred to as tractors—whose purpose is to tow a trailer or trailers along the roadway, and especially at high speeds along a highway. While the manufacturers of such trucks are doing their best to improve efficiencies by making their truck designs more aerodynamic, and making their engines more fuel efficient, the fact remains that significant aerodynamic losses occur as a result of trailer design, especially at high speed. The current trailer designs create drag on the trailer due to wind resistance as the trailer moves. Even if the engine and the aerodynamic design of the trucks is improved, there still remains the problem of reducing the drag created by the trailer, so as to thereby increase the fuel efficiency of the towing truck.

Federal and state authorities in the United States and Canada are increasingly tightening the restrictions as they apply to the trucking industry, requiring increased efficiency so as to reduce carbon and greenhouse gas emissions from the trucks. Indeed, the California Air Resources Board has mandated that trailers must manifest lower drag coefficients so as to reduce carbon and greenhouse gas emissions in that state.

One common approach to reduction of drag by trailers has been to fit or retrofit the trailers with fairings mounted along each side of the trailer, as seen in, for example, U.S. Pat. No. 7,578,541.

Another approach has been to provide a central drag reduction plate along at least a portion of the trailer length, as described in U.S. patent publication No. 2013/0285411. The central drag reduction plate can be located adjacent to an additional transverse fairing which extends across the trailer, in front of the rear set of wheels. It is well established that trailer wheel assemblies are not aerodynamic and can increase the drag on the trailer when it is driven.

Other approaches have included the use of a variety of fairing of different sizes and shapes located on the underside of the trailer. These are typically located at or near the landing gear assemblies, and/or the trailer wheel assemblies.

While these approaches do provide some aerodynamic advantages, and thus some fuel economy benefits, further improvement in this area is always desirable.

Further, common in the trucking industry is the use of multiple trailers attached in series to a single tractor. In this approach, a first additional trailer is typically attached to the tractor, or attached to a fifth wheel assembly located at the back of the tractor. At the back of the first trailer is trailer hitching assembly, such as an pintle hook, to which a converter dolly assembly can be attached. The converter dolly assembly comprises a support frame to which a wheel assembly, and an additional fifth wheel assembly is attached, and also includes a corresponding hitching assembly, such as an pintle eye at its front end, which is adapted to be connected to the trailer pintle hook. A further trailer (sometimes referred to as a "pup" trailer) can be attached to the converter dolly, by use of the additional fifth wheel.

In turn, the second trailer can also include a further pintle hook, or other hitching assembly, to which a further converter dolly, and thus trailer, can be fitted.

While use of converter dollies is well established in order to add an additional trailer or trailers to a tractor-trailer or truck-trailer configuration, there has been little attempt to improve the aerodynamics around the dolly, and its integral wheel assembly.

The present inventors have unexpectedly discovered that placing fairings on the dolly, in front of the wheels on each side of the wheel assembly, will reduce drag on the tractor-trailer combination, especially at higher speeds. Regardless of the use of other fairings fitted to the tractor and/or trailer, the fairings of the present invention, attached to the converter dolly, provide additional aerodynamic benefits.

DESCRIPTION OF THE PRIOR ART

Several patents teach the use of underbody trailer fairings, which have some adjustability as to their fitment to a trailer.

In U.S. Pat. No. 5,921,617 patent issued Jul. 13, 1999 to Loewen et al, and teaches a fairing assembly which has longitudinally extending forward and rearward sections. The intent is for the rearward section to be moved longitudinally so as to adjustably locate its rearward edge in a selected position forward of the wheel assembly of the trailer. To accommodate such adjustment, the rearward section is coupled to and longitudinally movable with the support frame for the wheel assembly, thereby maintaining its longitudinal adjustment relative to the trailer and to the wheel assembly. A hinge mechanism permits each section of the fairing to be pivotally displaced between lowered and raised positions. The patent states that improved fuel economy may be achieved while the trailer is towed at highway speeds over long distances with proper mounting of the fairings. The lowered and raised positions of the fairings are intended to accommodate situations where the trailer may be moved over ramps or uneven terrain.

U.S. Pat. No. 6,644,720 issued Nov. 11, 2003 to Long et al, and teaches an adjustable trailer underbody fairing structure, where the fairing includes an adjustable fairing panel which extends and collapses as the rear wheel assembly of the trailer is moved, so as to present a planar fairing surface at all times. Once again, the patent speaks of improving long distance fuel economy for the haulage of trailers by the fitment of fairings mounted at each lower longitudinal edge of the trailer. It is important, according to the patent, that the fairing can be adjusted quickly and easily to accommodate repositioning of the wheel assembly of the trailer, so that the length of the fairing shall be optimized in each situation so as to reach maximum fuel economy. Accordingly, the fairing structure includes a foldable panel which has a plurality of vertically oriented slats that are slidably mounted on a telescoping frame, each of the slats having a fabric mounted thereon. The intention is that the adjustable fairing panel shall fold and unfold in the manner of an accordion, so as to permit adjustment of the fairing. However, it is important, as well, for the fabric to be put into tension in order to maintain reduced fuel efficiency.

U.S. Patent Application Publication 2008/0238139, published Oct. 2, 2008, relates to an application filed by Cardolle. That application proposes a somewhat different approach so as to reduce fuel consumption, particularly for motorized vehicles when they are pulling trailers, many of which lack in aerodynamic design. The intent is to provide a structure which gives clearance between the axles of the trailer, and which allows access to the underbody of the trailer. This involves the provision of a transverse fairing which can be designed to facilitate the forward movement of the trailer by placing the fairing in front of a rear wheel assembly so as to divert airflow which is engulfed in the underside of the trailer towards the sides of the trailer. Accordingly, a fairing shell is placed in front of the wheel assembly and is shaped so as to divert the air that flows away from the wheel assembly. The shell covers substantially the frontal area of the wheel assembly, and may have side extensions which extend along the sides of the trailer so as to at least partially cover the sides of the wheel set.

U.S. Pat. No. 4,262,953 that issued to McErlane teaches "an airfoil or deflector panel for being mounted ahead of the rearmost set of wheels of a vehicle such as a truck or tractor-drawn trailer to direct air flow in a manner which reduces the relatively negative air pressure normally occurring behind a moving vehicle. The surface of the deflector which is presented in the direction of vehicle motion has a bilateral or compound convex curve."

U.S. Pat. No. 4,640,541 that issued to FitzGerald teaches "an air deflector for the rear wheels of vehicles such as trucks and trailers is disclosed. The deflector consists of a fairing suspended beneath the truck or trailer body immediately in front of the rear wheels and extending completely across the width of the body. The surface of the fairing is curved in both a lateral and a vertical direction to deflect impinging air and entrained water or snow around or under the wheels.

U.S. Pat. No. 4,938,524 that issued to Straub teaches "a semi-truck trailer gooseneck assembly comprises a single curved plate extending transversely between and beyond the twin parallel longitudinal girders to form a single lower flange. The curved plate extends from the assembly supporting the floor over the fifth wheel and connecting the king pin to the trailer.

U.S. Pat. No. 6,837,536 that issued to Schwartz teaches "a belly pan, or membrane of rigid yet flexible material is of elongated shaped outline to be mounted along the bottom of tractor-trailer. An aerodynamic shaped deflector is attached to the frontal portion of the landing gear of the trailer and attaches to the belly pan for reducing drag between the underside of the trailer and the support beams of the landing gear.

U.S. Pat. No. 6,974,178 that issued to Ortega teaches an apparatus for reducing the aerodynamic drag of a wheeled vehicle in a flow stream, the vehicle having a vehicle body and a wheel assembly supporting the vehicle body. The apparatus includes a baffle assembly adapted to be positioned upstream of the wheel assembly for deflecting airflow away from the wheel assembly so as to reduce the incident pressure on the wheel assembly.

U.S. Pat. No. 7,093,889 that issued to Graham teaches a device comprising a plurality of load bearing struts attached to the bottom of the rectangular body adjacent its sides, a plurality of opposing flat sheets attached to the load bearing struts, and angled flaps attached to the lower edge of the opposing sheets defining an obtuse angle with the opposing flat sheets extending inwardly with respect to the sides of the rectangular body to a predetermined height above the ground, which, stiffen the opposing flat sheets, bend to resist damage when struck by the ground, and guide airflow around the rear wheels of the vehicle to reduce its aerodynamic resistance when moving.

U.S. Pat. Publication No. 2008/0296930 by Roush et al., describes a trailer fairing or fairing for reducing aerodynamic drag from trailer landing gear and/or wheel assembly wherein one or more fairings is directly connected to the forward facing structural supports of the landing gear, or to the underside of the trailer, in order to reduce the aerodynamic drag of the wheel assembly or landing gear.

Also, various converter dollies are known which include fenders of various sizes and shapes. However, these are typically provided only to prevent water spray, or the like, and/or to protect the wheels. They provide little or no aerodynamic benefits.

SUMMARY OF THE INVENTION

The advantages set out hereinabove, as well as other objects and goals inherent thereto, are at least partially or fully provided by the trailer converter dolly fairings of the present invention, as set out herein below.

In accordance with one aspect of the present invention, therefore, there is provided a converter dolly apparatus comprising a support frame, a wheel assembly, a fifth wheel assembly, and a hitching apparatus, and additionally comprising at least one drag reduction, aerodynamic dolly fairing, attached to the converter dolly apparatus, and positioned in front of at least one wheel assembly.

Typically, a converter dolly will have a wheel assembly comprising at least one wheel on each side of the dolly, connected to each other through an axle. More typically, a single axle dolly will have two wheels located on either side of the dolly. Preferably, the converter dolly of the present invention, will include two dolly fairings, attached to the dolly, which are located in front of the wheel, or wheels, located on each side of the converter dolly. It will be noted, however, that use of a single fairing, mounted on the converter dolly, and which extends across the dolly in front of both sets of wheels, is not excluded from the present invention.

Dual axle dollies are also known in which two axles are provided. In this embodiment, wheel sets of two wheels are typically provided on each axle, on each side of the dolly. As such, the phrase "wheel assembly" includes any of these types of arrangements.

The dolly fairings can have any suitable shape and size, and can include angled plates, or the like, positioned in front of the wheels. Preferably, however, the converter dolly comprises two aerodynamic dolly fairings, each of which is located on a side of the converter dolly, in front of the wheels. The fairings can have any suitable aerodynamic shape so as to provide an improved aerodynamic effect. For example, the fairings can be horizontally or vertically angled flat plates, horizontally or vertical "V-shaped" plates, curved or conical shaped, or include pyramidal sections or the like. In one preferred embodiment, the dolly fairings have an aerodynamic shape which includes a section which can be described as a curved, hollow, frusto-conical section having a base, which is open towards, or around the wheels.

The dolly fairings can extend forwards or rearwards, to suit the individual environment. The dolly fairings can also extend rearward to cover the top or outside of the wheels, although this approach is not typically preferred since it might interfere with checking or adjustment of the wheel lug nuts, or the like.

The dolly fairings are preferably located so as to be below the level of the dolly fifth wheel, and thus, not interfere with connection of the additional trailer to the converter dolly. The dolly fairings can extend as close to the ground, as is deemed practical, but typically and preferably, remain between 5 and 30 cm from the ground, when in use.

The dolly fairing can also include a flexible material secured along at least a part of its bottom edge, to minimize damage to the dolly fairing. The flexible material can include products such as rubber, or flexible plastic, or the like, and can comprise between 10% to 25% of the height of the converter dolly fairing. For example, use of a material such as EPDM rubber (e.g. ethylene propylene diene monomer (M-class) rubber), secured along the bottom of the dolly fairing can provide protection against scuffing or breaking of the dolly fairing.

The height of the flexible material comprises a portion of the overall height of the fairing, and when present, preferably accounts for between 10% to 25% of the overall height of the dolly fairing.

The dolly fairings are preferably attached to the converter dolly frame, using any conventional fastening technique, so that the dolly fairings will not interfere with the wheels when the trailer is being turned. The fastening system can be rigid, but preferably is somewhat resilient so as to allow the dolly fairing to flex on impact during any accidental contact.

As a result of being attached to the dolly, the dolly fairings remain attached to the dolly, when the converter dolly is not in regular use. As such, there is no need to move or remove the dolly fairings, when the dolly is not in use.

In a further aspect, the present invention also provides a dolly fairing for use on a set of wheels in a wheel assembly, which dolly fairing is adapted to be attached to a converter dolly.

It will also be noted that the fifth wheel on some converter dollies is movable forwardly and rearwardly of the dolly, along the dolly's longitudinal axis. This is normally more common on dual axle dollies, and in these embodiments, the dolly fairings are preferably attached to the dolly in such a manner that the dolly will not interfere with the fifth wheel as it is moved.

The material of the dolly fairings may be chosen from any suitable materials for this application. Preferably, the dolly fairings are made from a material selected from the group consisting of steel, aluminum, alloys of steel, alloys of aluminum, plastics such as polyethylene or polypropylene, reinforced composite plastics materials such as fibreglass, thermoset composites, thermoplastic materials (e.g. TPO), and the like.

TPO typically refers to polymer/filler blends usually consisting of some fraction of PP (polypropylene), PE (polyethylene), BCPP (block copolymer polypropylene), rubber, and a reinforcing filler.

Also, combinations thereof and therebetween, such as sheets of steel sandwiching a plastic core, or combinations of different types of composite materials, and the like, might be used.

However, any suitable material can be used, and the use of other materials is not excluded from the present invention.

Preferably, the dolly fairing is somewhat resilient so that it will return to its original position if deflected as a result of coming in contact with any obstacles. Also, since the addition of dolly fairings adds weight to the entire tractor-trailer system, which can increase fuel consumption, it is desirable to have a dolly fairing that is as light as possible. As such, the use of light-weight, dolly fairings located immediately in front of the dolly wheels, is of greatest utility in the practise of the present invention.

BRIEF DESCRIPTION OF THE DRAWING

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example only, in association with the accompanying drawings in which:

FIG. 8 is a perspective view of a tandem axle converter dolly, according to the present invention; and.

DETAILED DESCRIPTION OF THE PREFERRED EMBODIMENTS

Figure 1A:
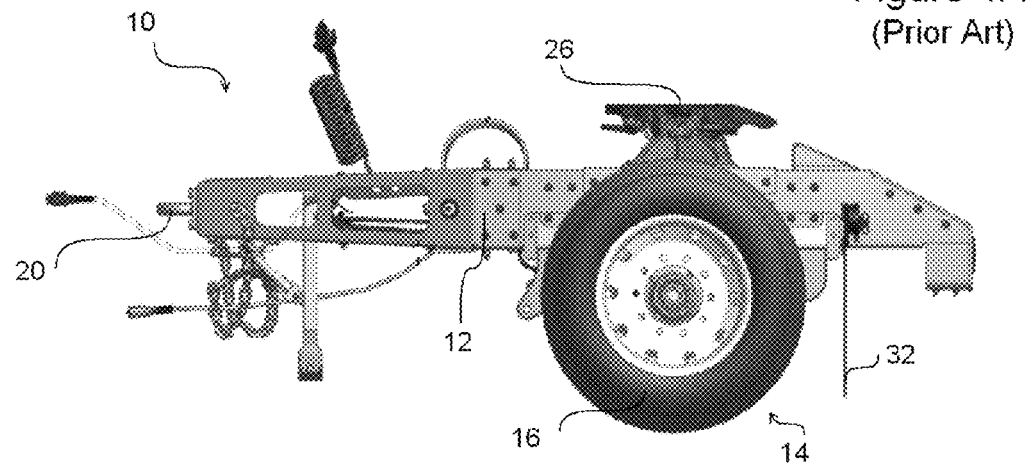
FIGS. 1A and 1B are side and top views of a single axle, prior art converter dolly.

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention. Also, unless otherwise specifically noted, all of the features described herein may be combined with any of the above aspects, in any combination.

Figure 1B:
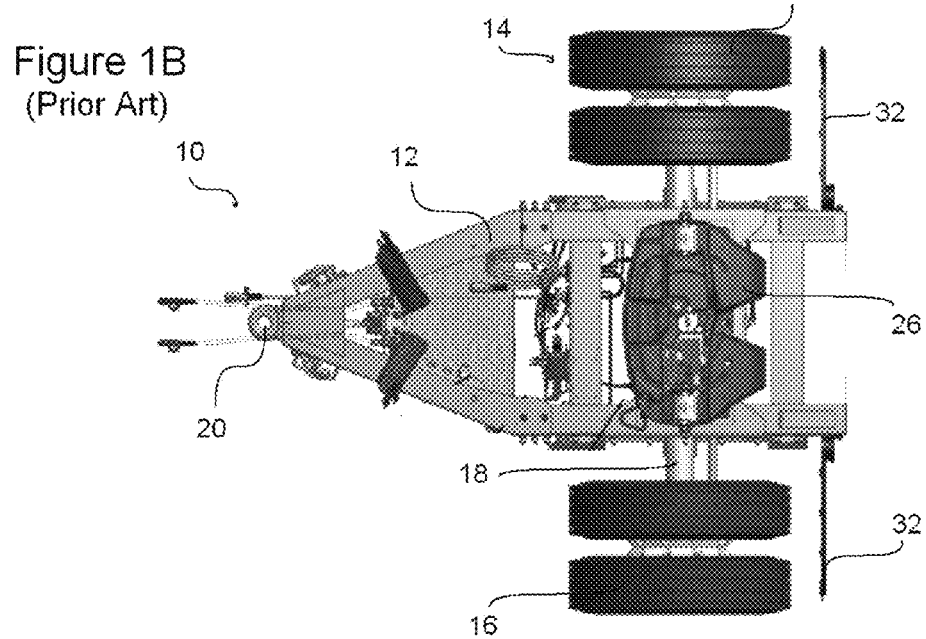

Referring to the drawings, and particularly to FIGS. 1A and 1B, a single axle converter dolly 10, in accordance with the prior art, is shown. Dolly 10 includes a frame section 12, to which a wheel assembly 14 is attached. Wheel assembly 14 includes wheels 16 located on each side of dolly 10, and a connecting axle 18 which connects wheels 16 to each other.

Figure 2:
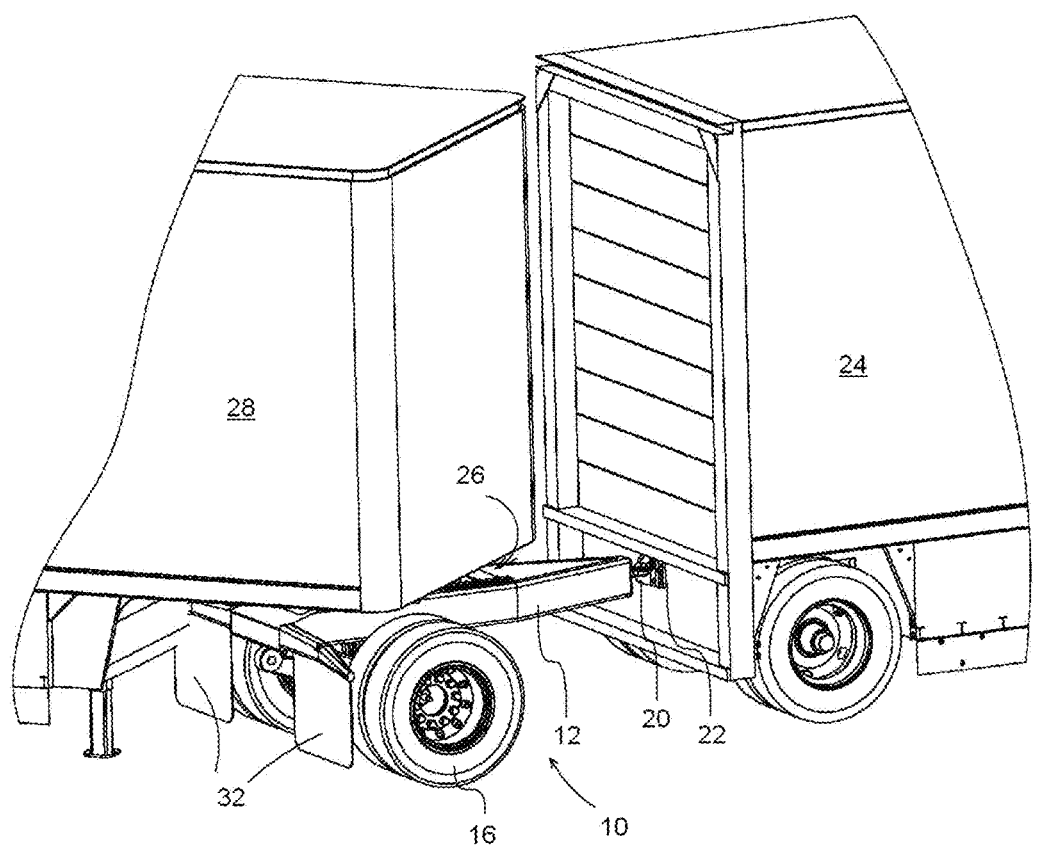
FIG. 2 is a side view of a prior art converter dolly in position between two trailers.
Figure 3:
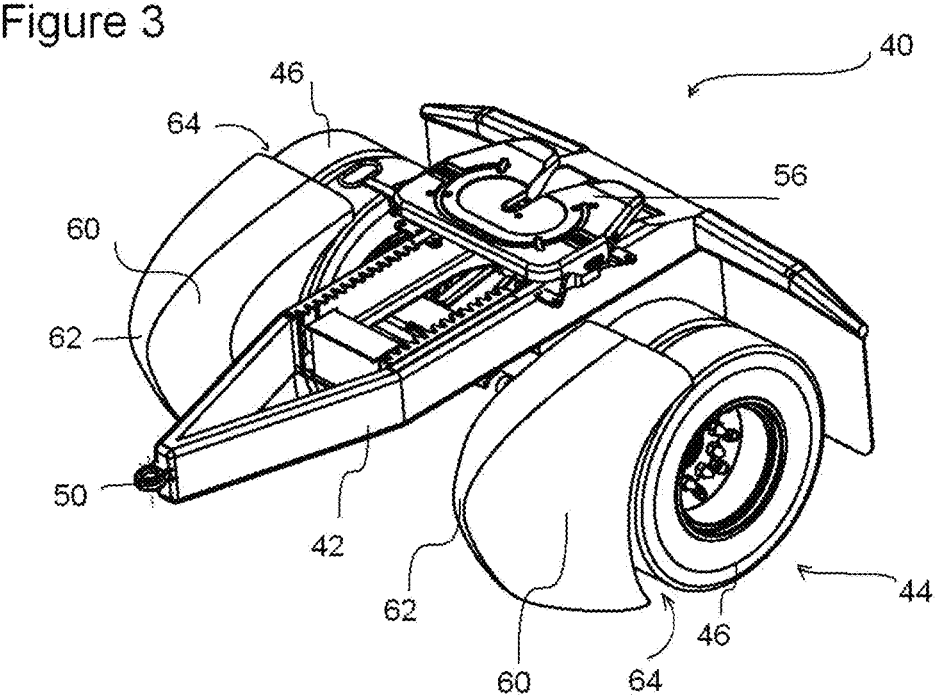
FIG. 3 is a perspective view of a converter dolly of the present invention, with converter dolly fairings attached.
Figure 4:
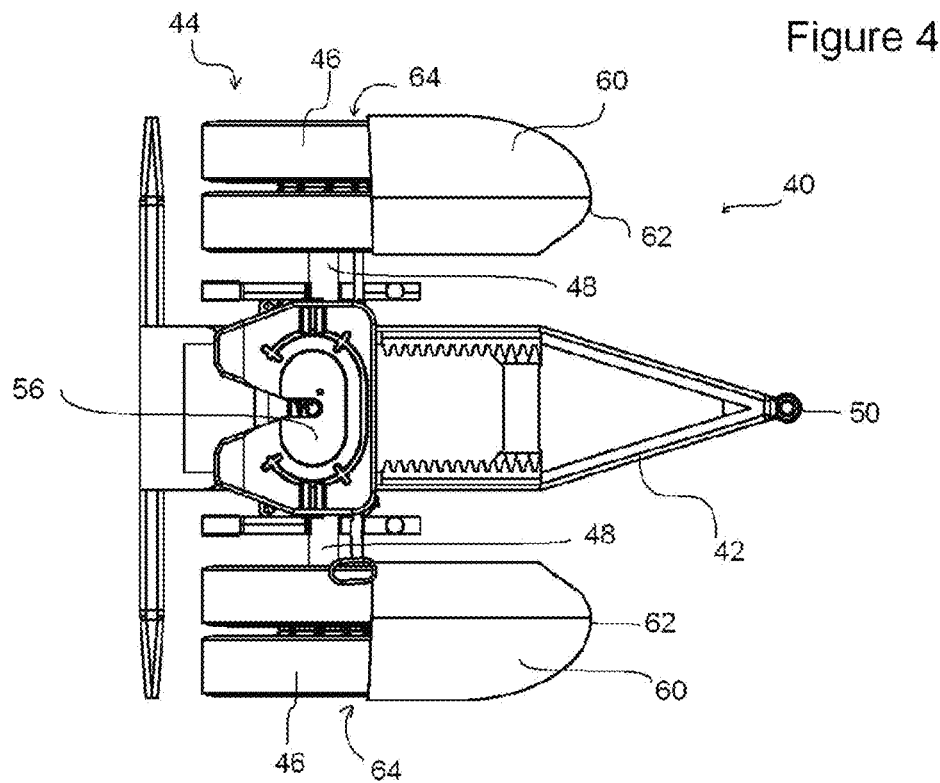
FIGS. 4 and 5 are top and side views of the converter dolly shown in FIG. 3.
Figure 5:
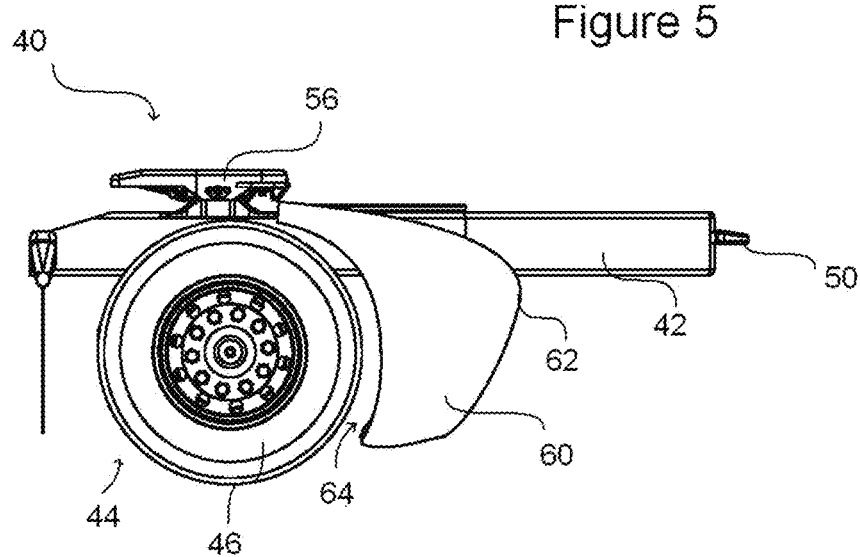
Figure 6:
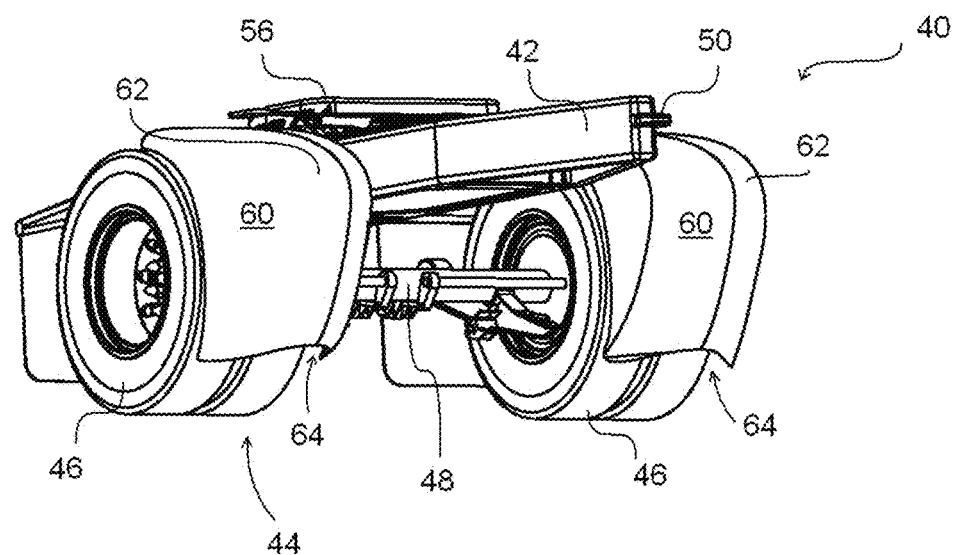
FIG. 6 is a further perspective view of the converter dolly shown in FIG. 3.

A hitching apparatus, which in this case is an pintle eye 20 is fitted to the front of frame 12, and is adapted to connect to an pintle hook 22, located at the rear of a first trailer 24, as seen in FIG. 2. Any suitable trailer hitching means can be used, however, including ball-type trailer hitches, and the like. A pintle eye and hook (or hitch) are most preferred however.

A fifth wheel assembly 26 is fitted on the top of frame 12, and is orientated so that a further, second trailer 28, can be attached to dolly 10, by use of the fifth wheel.

Commonly mud-flaps 32 are provided to control water spray, and the like, but these provide little or no aerodynamic benefits.

Dolly 10 also includes a variety of air hoses, support stands, chains, electrical connectors, and the like, in accordance with current practises.

In FIG. 2, the use of connector dolly 10 to connect a second trailer 28 to a first trailer 24, can clearly be seen.

In FIGS. 3 to 6, a converter dolly 40 of the present invention is shown comprising a frame 42, to which a wheel assembly 44 is attached. Wheel assembly 44 includes wheels 46 located on each side of dolly 40, and a connecting axle 48 which connects wheels 46 to each other. A hitching apparatus, which in this case is an pintle eye 50 is fitted to the front of frame 42, and is adapted to connect to an pintle hook (not shown) of a first trailer. A fifth wheel assembly 56 is fitted on the top of frame 42, and is orientated so that a further, second trailer can be attached to dolly 40, by use of the fifth wheel.

In FIGS. 3 to 6, two dolly fairings 60 are fitted to frame 42. Fairings 60 are hollow, made of composite reinforced fibreglass, and are located on each side of dolly 40. Fairings 60 are aerodynamically shaped, and are positioned immediately in front of wheels 46. At a front section of fairings 60 is a section 62 generally having a frusto-conical shape, and an open rear-ward section 64 which is open towards wheels 46. Preferably the dolly fairings on either side of the converter dolly are mirror images of each other, so that the installation of the dolly fairings on the dolly of the present invention, is preferably essentially symmetrical.

It can thus be noted that in FIGS. 3 to 6, and FIG. 4 in particular, that the left-hand fairing is the mirror image of the right-hand fairing. It can also be seen that the fairings on the dolly have a more curved outer surface, with respect to the longitudinal axis of the dolly, while the inner surface is more angled. Also, it can be seen that for the wheel assembly shown in FIGS. 3 to 6, the front of the fairing is shaped so that its leading edge is located inside of the outermost wheel, on each side of the dolly. This provides a stabilizing effect on the dolly, during use.

Figure 7:
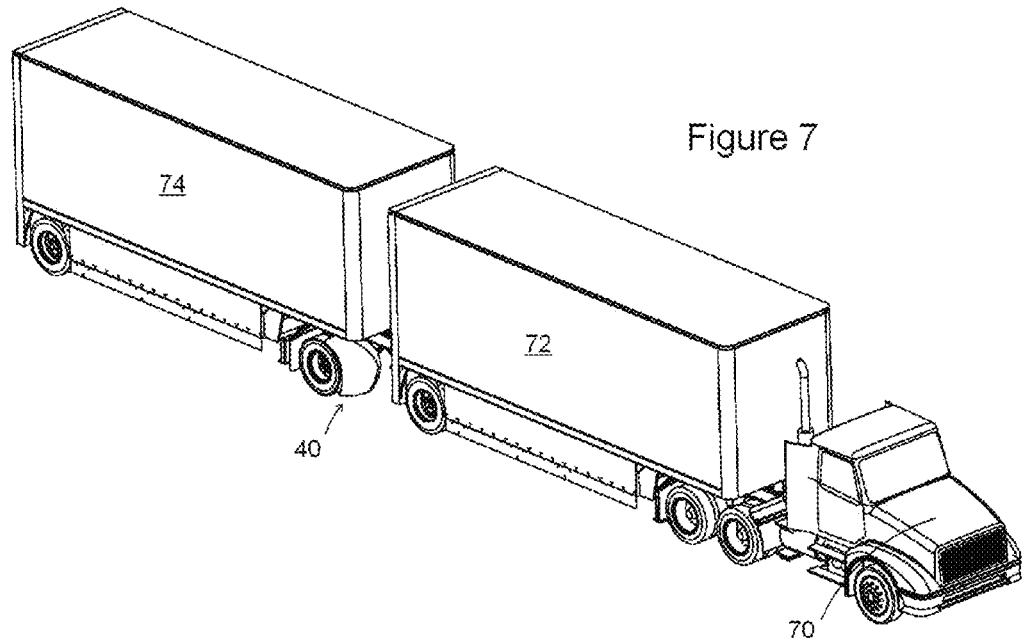
FIG. 7 is a perspective view of a tractor-trailer assembly utilizing the converter dolly of the present invention.

In FIG. 7, a perspective view of a tractor-trailer system is shown having a tractor 70 with a first trailer 72 connected to tractor 70. At the back of trailer 72 is a converter dolly 40 of the present invention, to which is attached a second trailer 74.

Figure 8:
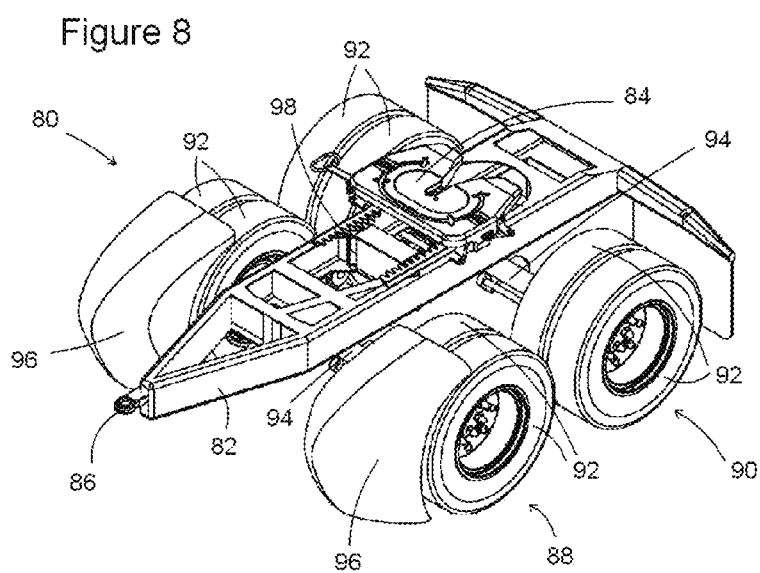

In FIG. 8, a dual axle dolly 80 is shown, having a frame 82, a fifth wheel 84, an attachment pintle eye 86, and two wheel assemblies 88 and 90, and each having two wheels 92 on each side of dolly 80. Each wheel assembly 88 and 90 has an axle 94 connecting the two wheels 92 on each side of dolly 80 to the corresponding two wheels 92 on the other side of dolly 80. In front of each set of wheels 92 of wheel assembly 88, is a dolly fairing 96, according to the present invention. It is also noted, that fifth wheel 84 is movable along the longitudinal axis of dolly 80, by use of locking set 98.

Figure 9:
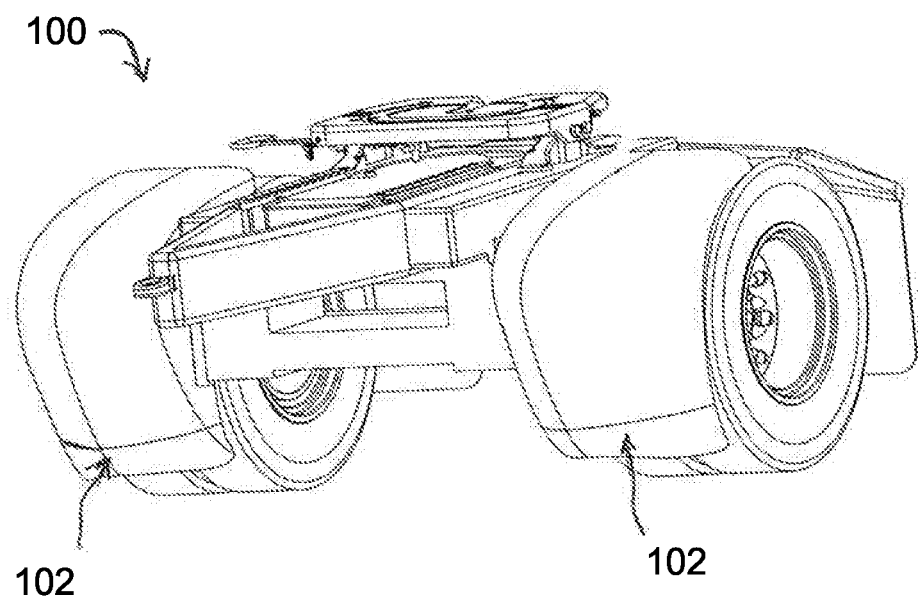
FIG. 9 is a perspective view is shown, of a modified version of the converter dolly of FIG. 3.

In FIG. 9, a front perspective view of a modified converter dolly fairing 100, is shown, which is similar in structure to converter dolly fairing 40, shown in FIGS. 3 to 6. However, at the bottom edge of fairing 100, a flexible material 102, made of an EPDM rubber, is provided on each side, so as to protect against scuffing or breaking of converter dolly fairing 100.

There has thus been described a converter dolly fairing system which may be employed to reduce the drag on a towed trailer, particularly one which is being towed at high speed along a highway, by use of a converter dolly. Thus, it is apparent that there has been provided, in accordance with the present invention, a converter dolly which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps. Further, the invention illustratively disclosed herein suitably may be practiced in the absence of any element which is not specifically disclosed herein.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element. Also, terms such as "forwardly", "rearwardly", "up" or "down", or the like, are used in their normal sense which respect to the use of the dolly in its normal operation.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

The invention claimed is:

1. A converter dolly comprising a support frame, a wheel assembly comprising at least one axle having a first set of at least two wheels, with at least one wheel located on each side of said dolly, a fifth wheel assembly, and a pintle eye for use as a hitching apparatus, and additionally comprising drag reducing, aerodynamic dolly fairings on each side of said converter dolly, which dolly fairings are positioned in front of the wheels on each side of said wheel assembly, and
    wherein each dolly fairing on each side of said converter dolly has a front section of a curved, hollow, frusto-conical section having a base open towards, or around, said at least one wheel on each side of said wheel assembly, an angled inner surface on the inner part of each fairing, a more curved outer surface on the outer part of each fairing, and having a leading edge on said front section which leading edge is located inside of a middle of said fairing in front of the at least one wheel on each side of the dolly, and
    wherein said dolly fairings on each side of said converter dolly are mirror images of each other, and are essentially symmetrical when installed on said converter dolly.

2. A converter dolly as claimed in claim 1 wherein said at least one wheel comprises two wheels located on each side of the dolly, which are connected together by a single axle.

3. A converter dolly as claimed in claim 1 wherein said dolly fairings on each side of said converter dolly additionally comprise a flexible material secured along their bottom edge.

4. A converter dolly as claimed in claim 1 wherein said fifth wheel is moveable along a longitudinal axis of said dolly.

5. A converter dolly as claimed in claim 1 wherein said at least one axle is a dual axle assembly having two axles, and
    said dual axle assembly having a second set of at least two wheels attached to a second axle and having said at least one wheel on each axle on each side of the dolly.

6. A converter dolly as claimed in claim 5, wherein the at least one wheel includes two wheels attached to each axle on each side of the dolly.

7. A converter dolly as claimed in claim 1 wherein each of said dolly fairings is made from a material selected from the group consisting of steel, aluminum, alloys of steel, alloys of aluminum, thermoplastic materials, polyethylene, polypropylene or TPO, reinforced composite plastics, fibreglass and thermoset composites.

8. A converter dolly as claimed in claim 7 wherein each of said dolly fairings is resilient.

9. A convertor dolly as claimed in claim 7 wherein each of said dolly fairings is made of composite fibreglass.

* * * * *